(12) United States Patent
Kobayashi et al.

(10) Patent No.: US 9,098,656 B2
(45) Date of Patent: Aug. 4, 2015

(54) COMPUTER-READABLE RECORDING MEDIUM IN WHICH THERMAL HYDRAULIC SIMULATION PROGRAM IS STORED, THERMAL HYDRAULIC SIMULATING DEVICE, AND METHOD FOR THERMAL HYDRAULIC SIMULATION

(75) Inventors: Sachio Kobayashi, Kawasaki (JP); Yuichi Sato, Kawasaki (JP); Hiroki Kobayashi, Kawasaki (JP); Hideki Abe, Kawasaki (JP); Masayoshi Hashima, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 525 days.

(21) Appl. No.: 13/332,515

(22) Filed: Dec. 21, 2011

(65) Prior Publication Data

US 2012/0239355 A1   Sep. 20, 2012

(30) Foreign Application Priority Data

Mar. 18, 2011   (JP) .................................. 2011-060707

(51) Int. Cl.
 G06F 7/60   (2006.01)
 G06F 17/10   (2006.01)
 G06F 17/50   (2006.01)
(52) U.S. Cl.
 CPC ........ *G06F 17/5018* (2013.01); *G06F 2217/80* (2013.01)
(58) Field of Classification Search
 CPC .......................... G06F 17/5009; G06F 2217/80
 USPC ........................................................... 703/2
 See application file for complete search history.

(56) References Cited

U.S. PATENT DOCUMENTS

| | | | |
|---|---|---|---|
| 5,619,433 A * | 4/1997 | Wang et al. | 703/18 |
| 5,638,413 A * | 6/1997 | Uematsu et al. | 376/245 |
| 6,268,863 B1 | 7/2001 | Rioux | |
| 6,668,206 B1 | 12/2003 | Akaike et al. | |
| 7,480,596 B2 | 1/2009 | Hashima et al. | |
| 2009/0138253 A1 | 5/2009 | Sazawa et al. | |

FOREIGN PATENT DOCUMENTS

| | | |
|---|---|---|
| JP | 63-177248 A | 7/1988 |
| JP | 2000-348214 | 12/2000 |
| JP | 2001-519575 | 10/2001 |
| JP | 2005-339350 A | 12/2005 |
| JP | 2007-179501 | 7/2007 |

(Continued)

OTHER PUBLICATIONS

Meng, Zhaocan, and Zhijian Zhang. "Study on Three-Dimensional Thermal Hydraulic Simulation of Reactor Core Based on THEATRe Code." Zero-Carbon Energy Kyoto 2009. Springer Japan, 2010. 279-285.*

(Continued)

*Primary Examiner* — Aniss Chad
(74) *Attorney, Agent, or Firm* — Fujitsu Patent Center

(57) ABSTRACT

In the event of modifying analysis condition, after the simulation of a first time step carried out when the analysis condition is modified finishes and before the simulation of a second time step next after the first step starts, the modified analysis condition is referred and the simulation based on the modified analysis condition is carried out in the next time step.

18 Claims, 11 Drawing Sheets

(56) References Cited

FOREIGN PATENT DOCUMENTS

| JP | 2009-134369 | 6/2009 |
|---|---|---|
| WO | WO-2004-025522 | 3/2004 |

OTHER PUBLICATIONS

Hossain, K., et al. "Development of a fast 3D thermal-hydraulic tool for design and safety studies for HTRS." Nuclear Engineering and Design 238.11 (2008): 2976-2984.*

Aktas, B., 2003. Level tracking in thermal-hydraulic simulations of nuclear reactors, PhD thesis. The Pennsylvania State University, USA.*

Japanese Office Action mailed Aug. 5, 2014 for corresponding Japanese Patent Application No. 2011-060707, with Partial English Translation, 12 pages.

Pfaffinger, Michael et al., "An Interactive Thermal Fluid Simulator for the Design of HVAC Systems," Proceedings of the 2007 ASCE International Workshop on Computing in Civil Engineering, American Society of Civil Engineers, Jul. 24-27, 2007, pp. 583-590.

Design Education Group, Kanawaza University, Creative Mechanical Design Employing Three-dimensional CAD, CAE, and CAM; -Design and Manufacturing Employing SolidWorks-, Nikkan Kogyo Shimbun, Aug. 27, 2009, 1st Ed., p. 197, with Partial English Translation.

Tsuwa, Yoshiaki et al., Application Software for SX-4 Series, NEC Technical Journal, NEC Creative, Co. Ltd., Nov. 30, 1995, vol. 48, No. 11, pp. 66-74, with Partial English Translation.

Japanese Office Action mailed Nov. 25, 2014 for corresponding Japanese Patent Application No. 2011-060707, with Partial English Translation, 8 pages.

\* cited by examiner

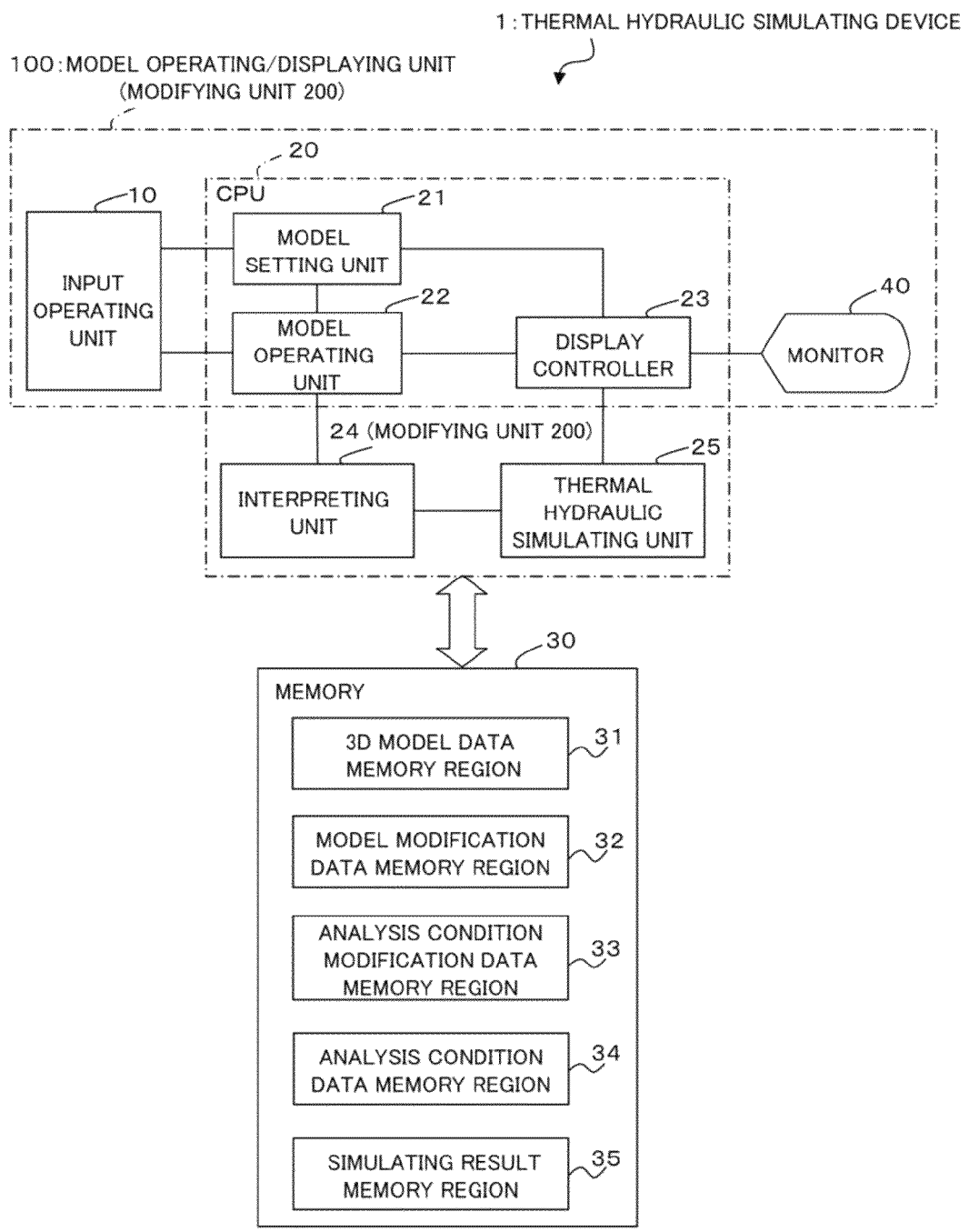

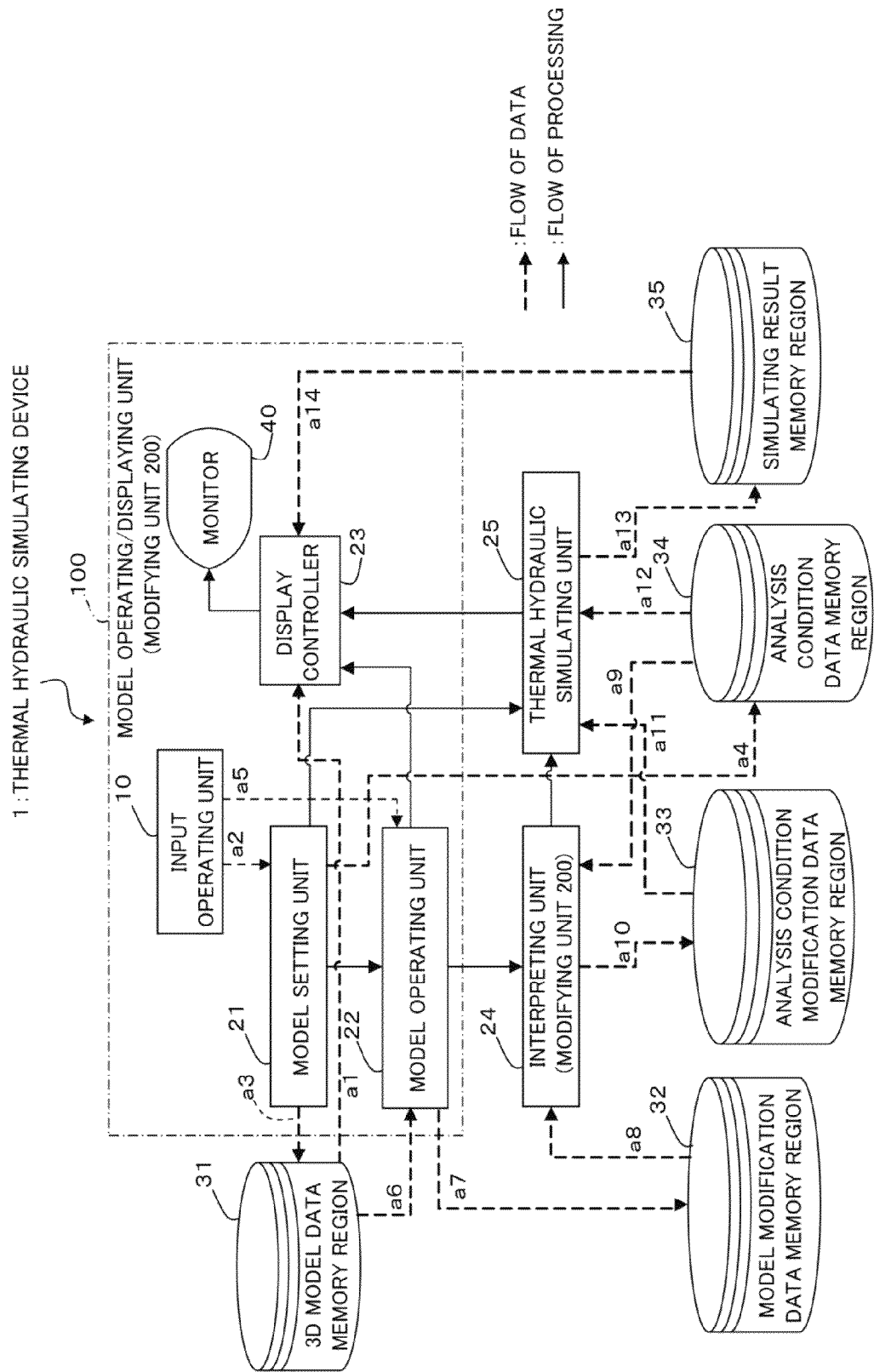

OPEN
MOVABLE
DIRECTION

CLOSE

COMPUTER-READABLE RECORDING MEDIUM IN WHICH THERMAL HYDRAULIC SIMULATION PROGRAM IS STORED, THERMAL HYDRAULIC SIMULATING DEVICE, AND METHOD FOR THERMAL HYDRAULIC SIMULATION

CROSS-REFERENCE TO RELATED APPLICATION

This application is based upon and claims the benefit of priority of the prior Japanese Application No. 2011-060707 filed on Mar. 18, 2011 in Japan, the entire contents of which are hereby incorporated by reference.

FIELD

The embodiment discussed herein is a thermal hydraulic simulation program that carries out a simulation of a velocity field and a temperature field, a thermal hydraulic simulating device, and a method of thermal hydraulic simulation.

BACKGROUND

In developing a product such as a server and in constructing a structure such as a data center, thermal design takes place in order to determine the proper positions of cooling mechanisms, air-conditioning facilities, and the like. For efficient thermal design, it is important to carry out a thermal hydraulic simulation to grasp the thermal distribution and the flow of air inside an object to be designed beforehand. Namely, before a prototype of an object to be designed is manufactured, a thermal hydraulic simulation is carried out on a computer under analysis condition variously modified by the computer, and on the basis of the results of the simulation under the various conditions, the thermal design can be examined depending on trial and error.

Known simulation schemes are the Software In the Loop Simulation (SILS) that carries out a software simulation to incorporate a handling function into a vehicle and the interactive simulation for a mechanism simulation. In an interactive simulation, when the user makes an operation of an object to be simulated, the result of simulation reflecting the operation is immediately visualized.

However, the above interactive simulation has not been applied to a thermal hydraulic simulation for the following reasons.

Generally, a thermal hydraulic simulation previously sets analysis condition including a boundary condition and other condition and a number of time steps that chronologically continue, and carries out a time series simulation in which the analysis through solving thermal hydraulic equations using the above analysis condition is repeated in the respective time steps. If an analysis condition is modified while such a time series simulation is being carried out, that is, while the analysis of a single time step is being carried out, the analysis using thermal hydraulic equations fails to attain a correct result of simulation.

For the above, in a thermal hydraulic simulation, modification in analysis condition during the analysis needs to previously set time series change in analysis condition, and the result of simulation in which the modification in analysis condition is reflected is obtained through inevitable restarting of the analysis from the first time step. Consequently, it is impossible for the user to immediately reflect a modification in analysis condition, made during the analysis, in the simulation, so that the user does not immediately grasp the influence caused by the modification in analysis condition. Furthermore, to obtain the result of a simulation in which the modification in analysis condition is reflected takes a long processing time.

PRIOR ART REFERENCE

Patent Reference

[Patent Reference 1] Pamphlet of WO2004/025522
[Patent Reference 2] Japanese National Publication of International Patent Application No. 2001-519575
[Patent Reference 3] Japanese Laid-Open Patent Publication No. 2009-134369
[Patent Reference 4] Japanese Laid-Open Patent Publication No. 2000-348214
[Patent Reference 5] Japanese Laid-Open Patent Publication No. 2007-179501

SUMMARY

There is provided a non-transitory computer-readable recording medium in which a thermal hydraulic simulating program that instructs a computer to carry out a simulation of a velocity field and/or a temperature field, the program instructing the computer to execute: carrying out the simulation by solving a thermal hydraulic equation on the basis of an analysis condition in each time step; modifying the analysis condition; after the simulation of a first time step carried out when the analysis condition is modified finishes and before the simulation of a second time step next after the first step starts, referring to the modified analysis condition; and carrying out the simulation based on the modified analysis condition in the second time step.

There is provided a thermal hydraulic simulating device that carries out a simulation of a velocity field and/or a temperature field, the simulator including: a simulating unit that carries out the simulation by solving a thermal hydraulic equation on the basis of an analysis condition in each time step; and a modifying unit that modifies the analysis condition, wherein after the simulation of a first time step carried out when the analysis condition is modified by the modifying unit finishes and before the simulation of a second time step next after the first step starts, the simulating unit refers to the modified analysis condition, and carries out the simulation based on the modified analysis condition in the second time step.

Furthermore, there is provided a method for a thermal hydraulic simulation of a velocity filed and/or a temperature field using a computer, including: carrying out the simulation by solving a thermal hydraulic equation on the basis of an analysis condition in each time step; modifying the analysis condition; after the simulation of a first time step carried out when the analysis condition is modified finishes and before the simulation of a second time step next after the first step starts, referring to the modified analysis condition; and carrying out the simulation based on the modified analysis condition in the second time step.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF THE DRAWINGS

FIG. 1 is a block diagram schematically illustrating the hardware configuration and the functional configuration of a thermal hydraulic simulating device according to a first embodiment;

FIG. 2 is a diagram illustrating the functional configuration and operation of a thermal hydraulic simulating device of the first embodiment;

DESCRIPTION OF THE PREFERRED EMBODIMENTS

Figure 3A:
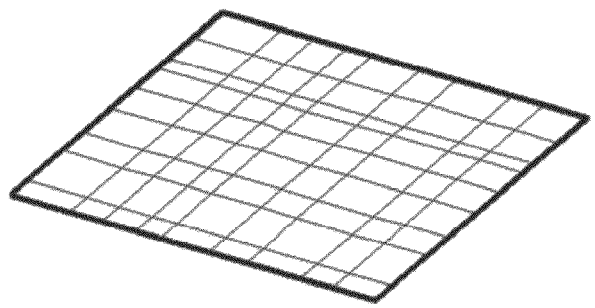
FIGS. 3A and 3B are diagrams illustrating grid models used in a thermal hydraulic simulation according to the first embodiment.

Hereinafter, a first embodiment will now be described with reference to the accompanying drawings.

(1) Configuration and Function of a Thermal Hydraulic Simulating Device According to the First Embodiment:

FIG. 1 is a block diagram schematically illustrating the hardware configuration and the functional configuration of a thermal hydraulic simulating device 1 of the first embodiment; and FIG. 2 is a diagram illustrating the functional configuration and operation of the thermal hydraulic simulating device 1 of the first embodiment.

The thermal hydraulic simulating device 1 carries out a function of simulating a velocity field and/or a temperature field interactively with a user. In order to accomplish the function, the thermal hydraulic simulating device 1 includes an input operating unit 10, a processor 20, a memory 30, and a monitor 40. Here, the input operating unit 10 is a man-machine interface, which is operated by the user to input various data pieces into the thermal hydraulic simulating device 1 and is exemplified by a mouse and a keyboard. The processor 20 is a CPU (Central Processing Unit). The memory 30 may be an internal memory device such as a RAM (Random Access Memory), a ROM (Read Only Memory), a HDD (Hard Disk Drive), and an SSD (Solid State Drive), or may be an external memory device. The monitor 40 is a display such as a CRT (Cathode Ray Tube), and a LCD (Liquid Crystal Display).

The processor 20 executes a thermal hydraulic simulating program and thereby functions as a model setting unit 21, a model operating unit 22, a display controller 23, an interpreting unit 24, and a simulating unit 25, which are to be detailed below.

The memory 30 has memory regions 31-35 respectively store 3D model data, model modification data, analysis condition modification data, analysis condition data, and simulation results, as detailed below, and additionally has a region (not illustrated) that stores the thermal hydraulic simulating program.

The monitor 40 displays various information pieces under the control of the display controller 23, and displays a 3D model represents a space of the velocity field and/or the temperature field to be subjected to the thermal hydraulic simulation on the basis of the 3D model data stored in the memory region 31 (see arrow a1 in FIG. 2). The monitor 40 also displays a status of operation (to be detailed below) that the input operating unit 10 and the model operating unit 22 make on the 3D model, and displays results of a thermal hydraulic simulation based on the simulation results stored in the memory region 35 (see arrow a14 of FIG. 2).

The model setting unit 21 receives, before a thermal hydraulic simulation starts, various pieces of information that are to be used for the thermal hydraulic simulation and that the user inputs via the input operating unit 10 using the function of a GUI (Graphical User Interface) (see arrow a2 in FIG. 2), and stores the received pieces of information into the memory 30. Using the stored information, the model setting unit 21 determines a 3D model and a thermal hydraulic model that represent the object of a thermal hydraulic simulation.

Here, the various pieces of information that are to be used for a thermal hydraulic simulation and that the model setting unit 21 sets include 3D model data representing a structure to be simulated and analysis condition data that is to be used for the thermal hydraulic simulation of the structure. The 3D model data and the analysis condition data are stored in the memory regions 31 and 34, respectively (see arrows a3 and a4 in FIG. 2, respectively).

The 3D model data stored in the memory region 31 includes, for example, 3D shape data such as a CAD (Computer Aided Design) model and a mesh model of the structure; setting data of a shutter mechanism and a sliding mechanism such as a sliding door; setting data of a rotating mechanism such as a cooling fan.

The analysis condition data stored in the memory region 34 includes, for example, calculation conditions to be used in the thermal hydraulic simulation, such as a shape model, physical property values, various boundary conditions, heat conditions, convergence conditions, resistance conditions, and flow conditions.

The model setting unit 21 has a function of, upon receipt of such 3D model data and analysis condition data that are input, associating the 3D model data and the thermal hydraulic analyzing model (analysis condition) with each other and storing association information indicating the association between the two models, as 3D model data, in the memory region 31. If the 3D model consists of a number of elements and/or parts, the above association information makes it possible to associate 3D model data of each element or each part with analysis condition data of the element or the part.

After the user operates the 3D model displayed on the monitor 40 using the GUI function via the input operating unit 10, the model operating unit 22 receives operating data related to the operation (see arrow a5 in FIG. 2). The model operating unit 22 then refers to the 3D model data of the 3D model operated by the user which data is stored in memory region 31 (see arrow a6 in FIG. 2), obtains model modification data related to the modifying the 3D model due to the operation on the basis of the 3D model data referred-to and the operating data received, and stores the model modification data into the memory region 32 (see arrow a7 in FIG. 2). In this embodiment, the model operating unit 22 and the input operating unit 10 collectively function as an operating unit that operates a 3D model displayed on the monitor 40.

Here, examples of operation made onto a 3D model on the monitor 40 via the input operating unit 10 are the following operations (11)-(13).

(11) operation instructing movement, rotation, addition, deletion, displaying, and canceling displaying of one element (part) consisting of the 3D model. This operation is instructed by, for example, clicking or dragging the mouse (i.e., the input operating unit 10).

(12) operating modifying operation of a sliding mechanism or a rotating mechanism set in the 3D model. An example of a sliding mechanism is a shutter mechanism (see FIG. 9) and that of a rotating mechanism is a cooling fan. The modification in operation of a sliding mechanism is instructed by, for example, dragging the mouse (the input operating unit 10). The modification in the operation of a rotating mechanism is instructed by designating the rotating mechanism to be modified by, for example, clicking the mouse and then inputting the rotating speed after the modification via the keyboard (i.e., the input operating unit 10).

(13) operation modifying an attribute of the 3D model. Assuming that one of the elements consisting of the 3D model is a heating element, an example of an attribute of the 3D model is a heating value of the heating element. The modification of an attribute is instructed by designating the attribute to be modified through, for example, clicking the mouse and then inputting a desired attribute value to be modified via the keyboard.

The interpreting unit 24 interprets, when a 3D model is modified by the operating units 10 and 22, the modification data of the 3D model related to the modification of the operating units 10 and 22 into modification data of the analysis condition of the thermal hydraulic simulation, so that the analysis condition is modified. Specifically, the interpreting unit 24 reads the model modification data from the memory region 32 (see arrow a8 in FIG. 2), and reads analysis condition data that is associated with the read model modification data from the memory region 34 (see arrow a9 in FIG. 2). The interpreting unit 24 calculates modification in the analysis condition data corresponding to the operation of the 3D model on the basis of the read model modification data, the geometrical data of the 3D model, and the analysis condition data. The interpreting unit 24 stores, as analysis condition modification data, the data related to the calculated modification in the analysis condition in the memory region 33 (see arrow a10 in FIG. 2). The memory region 34 stores the analysis condition data initially determined while the memory region 33 stores the analysis condition data modified according to the model operation.

The interpreting unit 24 interprets the model operation on the model into corresponding modification of the analysis condition data through, for example, the following processes (21)-(25).

(21) If the operating units 10 and 22 modify an attribute of a 3D model, at least the attribute after the modification is stored, as the model modification data, in the memory region 33. The interpreting unit 24 refers to the modified attribute stored in the memory region 33 and modifies, based on the modified attribute, a parameter of the analysis condition of the thermal hydraulic simulation, the parameter corresponding to the modified attribute value. The process related to modifying an attribute will be described below with reference to FIG. 6.

(22) If the operating units 10 and 22 translate a component of a 3D model, an amount (distance, direction) of translating is stored, as the model modification data, in the memory region 33. The interpreting unit 24 refers to the amount (distance, direction) of the translating stored in the memory region 33 and modifies the position of the boundary condition of the translated component according to the amount (distance, direction) of the translating. If the translated component is not arranged on a grid of the thermal hydraulic analyzing model, the interpreting unit 24 moves the position of the boundary condition of the translated component onto the nearest grid. Conversely, if the position of the boundary condition of the translated component is not arranged onto a grid, the interpreting unit 24 deletes the boundary condition of the translated component and adds another boundary condition that generates a reactive force to invert velocity in a direction perpendicular to the surface of the translated component disposed at a position after the translating to the modification data of the analysis condition. The detailed process related to translation of a component will be described below with reference to FIG. 7.

(23) If the operating units 10 and 22 rotate a component of a 3D model, data (axis and angle of the rotation) related to the rotating is stored, as the model modification data, in the memory region 33. The interpreting unit 24 refers to the data (axis and angle of the rotation) related to the rotating stored in the memory region 33, and modifies the position of the boundary condition of the rotated component through rotating the position of the boundary condition using the same axis and the same angle as those of the rotating of the component. If the rotated component is not arranged on a grid of the thermal hydraulic analyzing model, the interpreting unit 24 deletes the boundary condition of the rotated component and adds another boundary condition that generates a reactive force to invert velocity in a direction perpendicular to the surface of the rotated component disposed at a position after the rotating to the modification data of the analysis condition. The interpreting unit 24 further rotates the direction of flow related to the rotated component, the direction serving as a flow condition, using the same axis and the same angle those of the rotating of the component. Still further, the interpreting unit 24 distributes a resistance and/or a heat value, respectively serving as a resistance condition and/or a heat condition of the rotated component, into one or more cells that the boundary condition after the rotating overlies in accordance with an area ratio or a volume ratio of the cells, and thereby sets the new resistance condition and/or heat condition obtained by the distribution to be the modification data of the analysis condition. The process related to rotation of a component will be detailed below with reference to FIG. 8.

(24) The operating units 10 and 22 slide a sliding mechanism of a 3D model having an opening ratio in accordance with sliding, the opening ration after the sliding is calculated and stored, as the model modification data, in the memory region 33. The interpreting unit 24 modifies the resistance value, serving as a resistance condition, corresponding to the sliding mechanism in accordance with the opening ratio after the sliding. The process related to sliding of a sliding mechanism will be detailed below with reference to FIGS. 9 and 10.

(25) If the operating units 10 and 22 modify an operating speed (rotating speed) of a rotating mechanism of a 3D model, the rotating speeds before and after the rotating are stored, as the model modification data, in the memory region 33. The interpreting unit 24 refers to the rotating speeds before and after the modifying stored in the memory region 33, and modifies the analysis condition of the thermal hydraulic simulation related to the rotating mechanism, specifically, a flow condition (air quantity, flow rate) on the basis of the rotating speeds before and after the modification. The process related to modifying an operating speed of a rotating mechanism will be detailed below with reference to FIG. 11.

The input operating unit 10, the model setting unit 21, the model operating unit 22, the display controller 23, and the monitor 40 collectively function as a model operating/displaying unit 100 that displays a 3D model in real time and is capable of moving and rotating of a component or a mechanism of the 3D model.

The model operating/displaying unit 100 and the interpreting unit 24 collectively function as a modifying unit 200 that modifies the analysis condition of a thermal hydraulic simulation.

The simulating unit 25 carries out a thermal hydraulic simulation by solving thermal hydraulic equations for each time step on the basis of the analysis condition data and analysis condition modification data respectively stored in the memory regions 34 and 33 (see arrows a12 and a11 in FIG. 2). The simulating unit 25 stores the simulation result exemplified by a speed distribution of a fluid, a temperature distribution, and time in the memory region 35 (see arrow a13 in FIG. 2). The simulation result stored in the memory region 35 is displayed on the monitor 40 under the control of the display controller 23 (see arrow a14 of FIG. 2), or alternatively may be printed out by a non-illustrated printer.

Known methods of a thermal hydraulic simulation performed by the simulating unit 25 are gird method, particle method, and a grid Bolzmann method. Here, a thermal hydraulic simulation using a grid method is explained. In a normal thermal hydraulic simulation, a time series simulation is conducted in which a number of continuous time steps are set and calculation is repeated in each time step. Calculation of each time step solves the following simultaneous equations (1)-(3) and thereby obtains time evolution of the velocity field and the temperature field. Here, equation (1) corresponds to Navier-Stokes equation that is a nonlinear partial differential equation that describes fluid motion; equation (2) corresponds to continuous formula derived from law of conservation of mass concerning a flow of an incompressible fluid; and equation (3) corresponds to a thermal advection diffusion equation that describes the conduction of heat in the fluid.

$$\dot{u} = -(u \cdot \nabla)u + v\nabla^2 u - \frac{1}{\rho}\nabla p + f \qquad (1)$$

$$\nabla \cdot u = 0 \qquad (2)$$

$$\dot{T} = -(u \cdot \nabla)T + \kappa\nabla^2 T + S \qquad (3)$$

In these equations (1)-(3), the symbol "u" represents a rate vector of a fluid; the symbol "p" represents a pressure; the symbol "ρ" represents a density; the symbol "f" represents an external force vector affects per unit weight; the symbol "v" presents a coefficient of kinematic viscosity; the symbol "T" represents temperature; the symbol "K" represents a coefficient of conduction of heat; the symbol "S" represents a heat value received from the outside; and the symbol nabla "∇" represents a space derivative operator. The symbols "u" and "T" with dots on the top in the left sides of the equations (1) and (3) represent partial differences of the rate vector "u" and the temperature "T" with respect to time t, respectively.

Figure 3B:
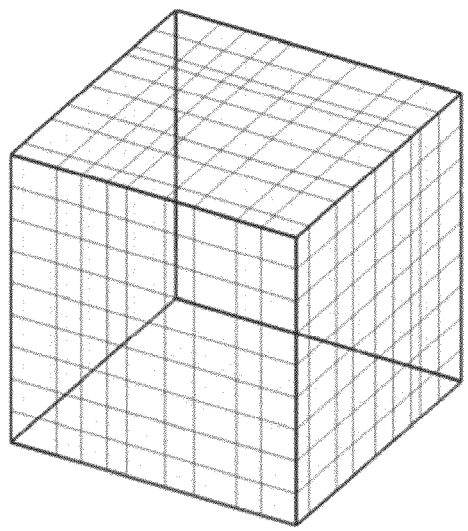

In a thermal hydraulic simulation of an incompressible fluid on a computer by solving the above simultaneous partial differential equations (1)-(3), the analysis space is discretized so that the simulating unit 25 discretely calculates differential values. An example of a discretization is to divide the continuous analysis space into grids as depicted in FIGS. 3A and 3B. Here, each rectangle or each rectangular parallelepiped defined by grids is referred to as a cell. FIGS. 3A and 3B represent grid models used in a thermal hydraulic simulation: specifically, FIG. 3A represents a two-dimensional grid model; and FIG. 3B represents a 3D grid model.

The simulating unit 25 of the first embodiment has the following function so that the analysis condition modified by the above modifying unit 200 is immediately reflected in the thermal hydraulic simulation of the ensuing step without restarting the thermal hydraulic simulation from the first time step. Specifically, the simulating unit 25 has a function for, if the modifying unit 200 modifies the analysis condition, referring to the analysis condition modified by the modifying unit 200 at the following referring timing and starting the simulation using the modified condition from the next time step.

The referring timing is after a simulation (analysis) carried out when the analysis condition is modified finishes and before the simulation (analysis) of the next time step starts. Specifically, the thermal hydraulic simulating device 1 of this embodiment separates a time step in which time forwarded by carrying out the analysis from a step in which time is not forwarded, and in a step of not forwarding time, the analysis condition is modified and referred. In other words, even if the analysis condition is modified during the analysis performed in a time step, the modification in the analysis condition is reflected in the thermal hydraulic simulation after completion of analysis of the time step. This function is detailed below with reference to FIG. 5.

(2) Operation of the Thermal Hydraulic Simulating Device of the First Embodiment:

Next, description will now be made in relation to operation of the thermal hydraulic simulating device 1 of the first embodiment having the above configuration with reference to FIGS. 4-11.

Figure 4:
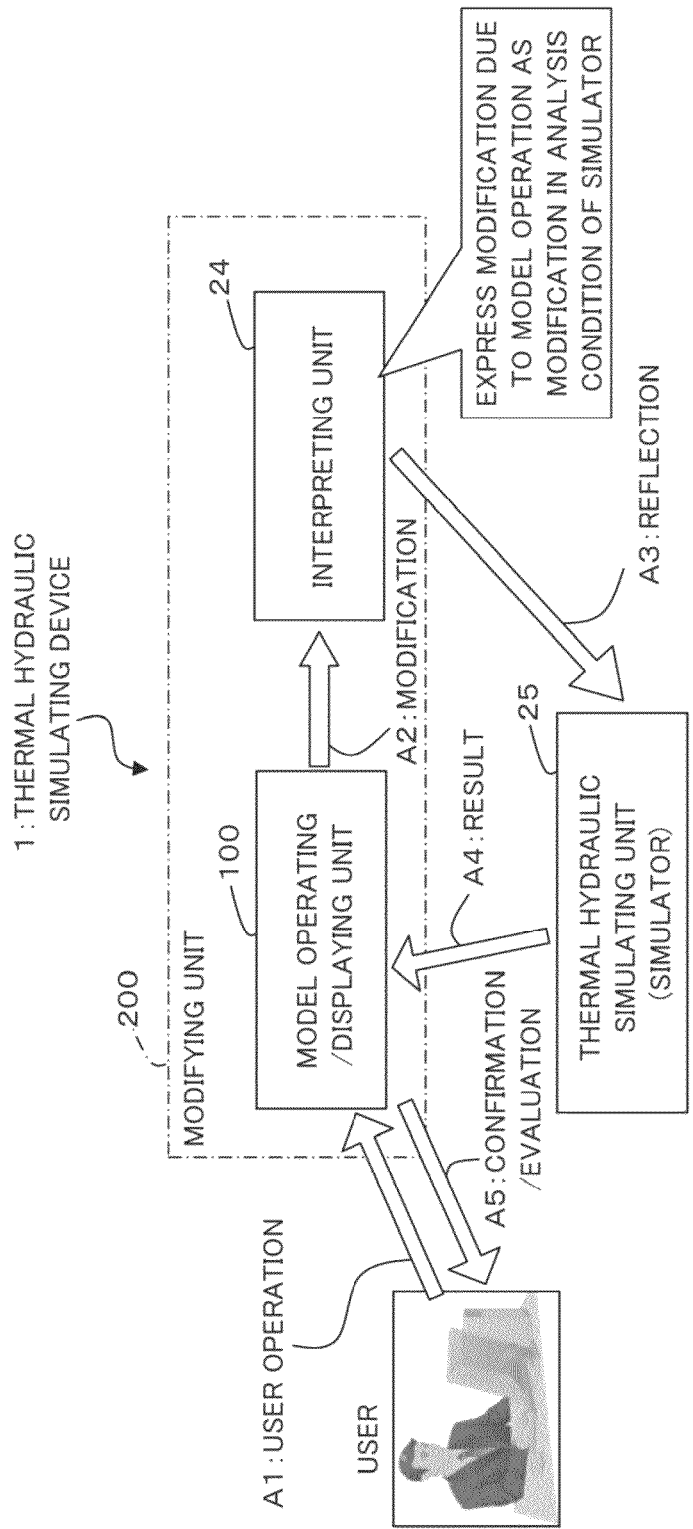
FIG. 4 is a diagram depicting an outline of operation of a thermal hydraulic simulating device of the first embodiment.

(2-1) Outline of Operation of the Thermal Hydraulic Simulating Device:

FIG. 4 is a diagram depicting an outline of operation of the thermal hydraulic simulating device 1 of the first embodiment. As illustrated in FIG. 4, the thermal hydraulic simulating device 1 of the first embodiment includes the model operating/displaying unit 100, the simulating unit 25, and the interpreting unit 24. The model operating/displaying unit 100 displays a 3D model on the monitor 40 in real time, and the user is allowed to operate the 3D model, such as moving and rotating, referring to the monitor 40. Then the interpreting unit 24 generates modification in the analysis condition based on the operation on the 3D model that the user made on the monitor 40 via the input operating unit 10, and the modification in the analysis condition is to be reflected in the analysis that the simulating unit 25 is to carry out.

The difference between a detailed 3D model that the model operating/displaying unit 100 treats and a thermal hydraulic analyzing model used in the thermal hydraulic simulation makes it impossible to reflect the user operation, without being processed, in the thermal hydraulic simulator.

For the above, the thermal hydraulic simulating device 1 includes the interpreting unit 24 disposed between the model operating/displaying unit 100 and the simulating unit 25. Specifically, the interpreting unit 24 interprets operation that the user made on a 3D model via the model operating/displaying unit 100 before or during the analysis conducted by the simulating unit 25 into modification in the analysis condition, so that the modification is immediately reflected in the analysis of the next time step to be carried out by the simulating unit 25. Thereby, the user can immediately obtain a simulation result in which the operation that the user makes on the 3D model via the model operating/displaying unit 100 is reflected and which is carried out by the simulating unit 25, so that an interactive thermal hydraulic simulation can be realized.

In the thermal hydraulic simulating device 1, the modification in the analysis condition corresponding to the operation that the use made on the 3D model is reflected in the thermal hydraulic simulation in the following succession of procedural steps (1) through (4).

(1) The user operates the 3D model via the model operating/displaying unit 100 (see arrow A1 in FIG. 4). Specifically, the user instructs movement, rotation, addition, deletion, displaying, and canceling displaying of one element (part) consisting of the 3D model; modifies the operation of a sliding mechanism or a rotating mechanism of the 3D model; or modifies an attribute of the 3D model as described above operations (11)-(13).

(2) The interpreting unit 24 converts the modification in the 3D model by step (1) into modification of the analysis condition associated with to the operated element (see arrow A2 in FIG. 4). Here, the 3D model of the model operating/displaying unit 100 is previously associated with the thermal hydraulic analyzing model of the simulating unit 25.

(3) The modification in the analysis condition in step (2) is reflected in analysis to be carried out by the simulating unit 25 (see arrow A3 in FIG. 4), so that the time series simulation is conducted. For this purpose, the simulating unit 25 refers to the analysis condition modification data stored in the memory region 33 after an analysis of a time step being carried out when the analysis condition is modified finishes and before the analysis of the next time step starts, that is, while the time is not forwarded by the simulation. Thereby, the simulating unit 25 can reflect the modified analysis condition in the analysis of the next time step (and subsequent time steps) without restarting the thermal hydraulic simulation from the first time step.

(4) The simulation result stored in the memory region 35 is displayed on the monitor 40 of the model operating/displaying unit 100 (see arrow A4 in FIG. 4). The user can confirm and evaluate the simulation result related to the operation made on the 3D model by referring the simulation result displayed on the monitor 40 (see arrow A5 in FIG. 4). Consequently, the thermal hydraulic simulating device 1 allows the user to carry out an interactive thermal hydraulic simulation.

(2-2) Succession of Procedural Steps Performed in the Thermal Hydraulic Simulating Device:

Next, description will now be made in relation to a succession of procedural steps performed in the thermal hydraulic simulating device 1, that is, the procedure of the interactive thermal hydraulic simulation performed in the thermal hydraulic simulating device 1 with reference to the flow diagram (steps S11-S23) of FIG. 5.

The model setting unit 21 receives, before a thermal hydraulic simulation starts, various pieces of information that are to be used for the thermal hydraulic simulation and that the user inputs via the input operating unit 10, and stores the received pieces of information in the memory regions 31 and 34 of the memory 30. Namely, a 3D model data representing a structure to be simulated is set in the memory region 31, and analysis condition data used for thermal hydraulic simulation on the structure is set in the memory region 34. Thereby, the 3D model and the thermal hydraulic model of a structure that is to be subjected to thermal hydraulic simulation are set (step S11).

Then the model setting unit 21 associates the 3D model and a thermal hydraulic analyzing model (analysis condition) with each other, and stores, as 3D model data, association data representing the association between the two models in the memory region 31 (step S12).

After that, upon the model setting unit 21 receives an instruction of executing the thermal hydraulic simulation input by the user via the input operating unit 10, the thermal hydraulic simulation starts (step S13).

After the start of the simulation, the thermal hydraulic simulating device 1 monitors whether the user modifies the 3D model via the model operating/displaying unit 100 (the operating units 10 and 22) (step S14).

If the 3D model is not modified (No step in step S14), the simulating unit 25 refers to the analysis condition data stored in the memory region (step S18), and on the basis of the analysis condition data referred, time evolution of the velocity field and the temperature field to be simulated is obtained by solving the above equations (1)-(3) in a single time step (steps S19 and S20).

Conversely, if the 3D model is modified (YES route in step S14), the processing of the following steps S15-S20 is to be performed.

First of all, the user modifies the 3D model by operating the input operating unit 10, for example, the above operations (11)-(13). Upon the model operating unit 22 receives the operating data related to the operating, the 3D model modification data related to the operating is obtained and stored, as the model modification data, in the memory region 32 (step S15).

Upon the model modification data is stored in the memory region 32, the interpreting unit 24 calculates the modification in the analysis condition, which modification corresponds to the model operation, on the basis of the model modification data stored in the memory region 32, geometrical data of the 3D model, analysis condition data, and others. Namely, the interpreting unit 24 converts the operating data related to operating into the analysis condition of the thermal hydraulic simulation (step S16). The result of the conversion by the interpreting unit 24 is stored, as the analysis condition modification data, in the memory region 33. Consequently, correction and modification in the analysis condition caused by the user operation are reflected in the memory region 33 that is to be referred by the simulating unit 25, and the corrected and modified analysis condition is reflected in the analysis to be carried out in the next time step (step S17).

After that, the simulating unit 25 refers to the analysis condition data and the analysis condition modification data respectively stored in memory regions 34 and 33 (step S18). On the basis of the referred analysis condition data and analysis condition modification data, the simulating unit 25 solves the above simultaneous partial differential equations (1)-(3) for a certain time step and thereby obtains time evolution of the velocity field and the temperature filed of a structure to be simulated (steps S19 and S20). The result of the simulation is stored in the memory region 35.

Upon completion of the thermal hydraulic simulation of a single time step, a determination is made whether now is the timing of displaying the simulation result (step S21). The timing of displaying a simulation result is preset in the predetermined region of the memory 30, and when the timing of displaying comes (YES route in step S21), the simulation result stored in the memory region 35 is displayed on the monitor 40 under the control of the display controller 23 (step S22).

Conversely, when the timing of displaying does not come yet (NO route in step S21) or after the simulation result is displayed, a determination is made, on the basis of a termination condition, whether the simulation is to be terminated (step S23). The termination condition is that a predetermined time period is elapsed from the start of the simulation or the calculation by the simulating unit 25 comes into a stationary state. If the termination condition is not satisfied and the simulation is not terminated yet (NO route in step S23), the procedure performed in the thermal hydraulic simulating device 1 returns to step S14. In contrast, if the termination condition is satisfied and the simulation is to be terminated (YES route in step S23), the thermal hydraulic simulating device 1 terminates the procedure.

As described above, if modification in the analysis condition is allowed during the analysis of a certain time step, that is, while the above simultaneous partial differential equations (thermal hydraulic equations) (1)-(3) are being solved, the simulation does not attain the correct result.

For the above, the first embodiment divides a conventional single step of a thermal hydraulic simulation into three sub-steps of: reflecting a correction and/or modification in the analysis condition caused by the operation of the user in the memory 30 (step S17); referring to the analysis condition modification data (step S18); and solving the thermal hydraulic equations (step S19). These sub-steps make it possible to refer to the modified analysis condition at the timing of after the analysis carried out when the analysis condition is modified finishes and before the analysis of the next time step starts. Thereby, the analysis condition is corrected and modified, and referred at respective proper timings.

(2-3) Conversion (Interpreting) of User Operation into Analysis Condition:

As described above, the model operating unit 22 modifies the 3D model through operating of the input operating unit 10, that is, through the above operations (11)-(13) in step S15. The modification in the 3D model due to these operations is converted into the modification in the analysis condition of the thermal hydraulic simulation by the interpreting unit 24 in step S16. Here, examples of the analysis condition are a boundary condition related to a wall, a flow condition, a resistance condition, and a heat condition. Conversion of a user operation into the analysis condition has a large number of combinations, typical five of which will be detailed below.

Figure 6:
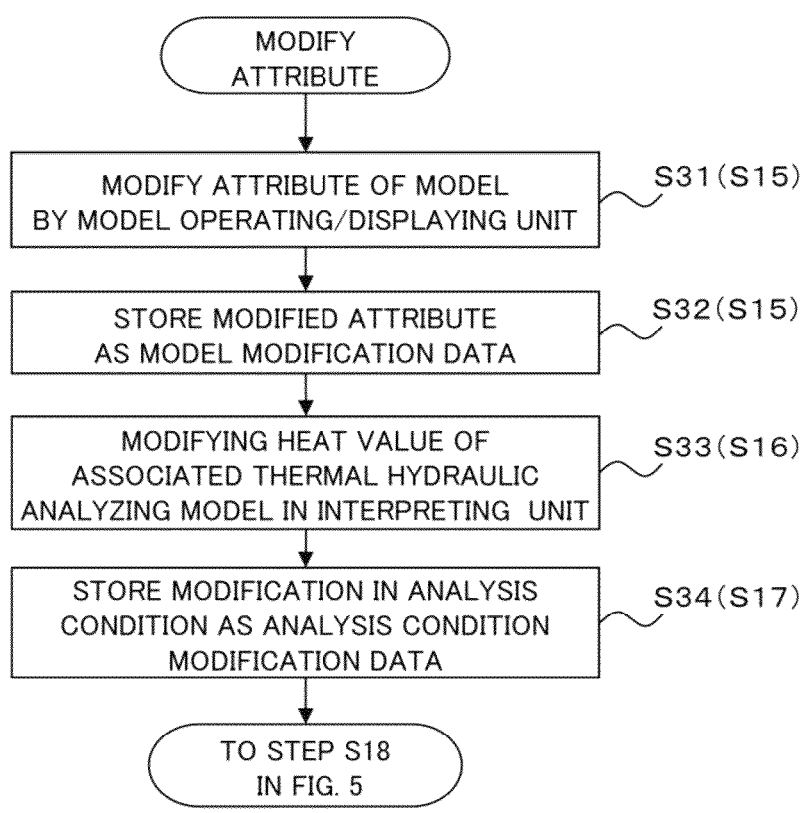
FIG. 6 is a flow diagram illustrating a succession of procedural steps performed in a thermal hydraulic simulating device of the first embodiment when an attribute of a 3D model is modified.

(2-3-1) Modification in Attribute:

First, description will now be made in relation to a case where the model operation by the operating units 10 and 22 is a modification of an attribute of the 3D model and the modification of the attribution, in the form of a modification in parameter, is reflected in the thermal hydraulic simulation with reference to a flow diagram (steps S31-S34) of FIG. 6. An attribute to be modified here is assumed to be related to a heat value.

Upon an attribute related to a heat value of the 3D model is modified through the model operation (see above operation (13)) by the operating units 10 and 22 (step S31), the modified attribute value (numeric value) is stored, as model modification data, in the memory region 33 (step S32). The processing of steps S31 and S32 correspond to that of step S15 in FIG. 5.

The numeric value after the modification stored in the memory region 33 is referred by the interpreting unit 24, which then modifies the heat value (included in the analysis condition) of the thermal hydraulic analyzing model on the basis of the referred numeric value (step S33). The processing of step S33 corresponds to that of step S16 of FIG. 5.

The result of modifying the heat value by the interpreting unit 24 is stored, as analysis condition modification data, in the memory region 33 (step S34). Consequently, correction and modification of the heat value of the thermal hydraulic analyzing model due to the user operation are reflected in the memory region 33, which the simulating unit 25 refers in step S18, and thereby the heat value after the correction and modification is reflected in the analysis to be carried out in next time step. The processing of step S34 corresponds to that of step S17 in FIG. 5.

Figure 7:
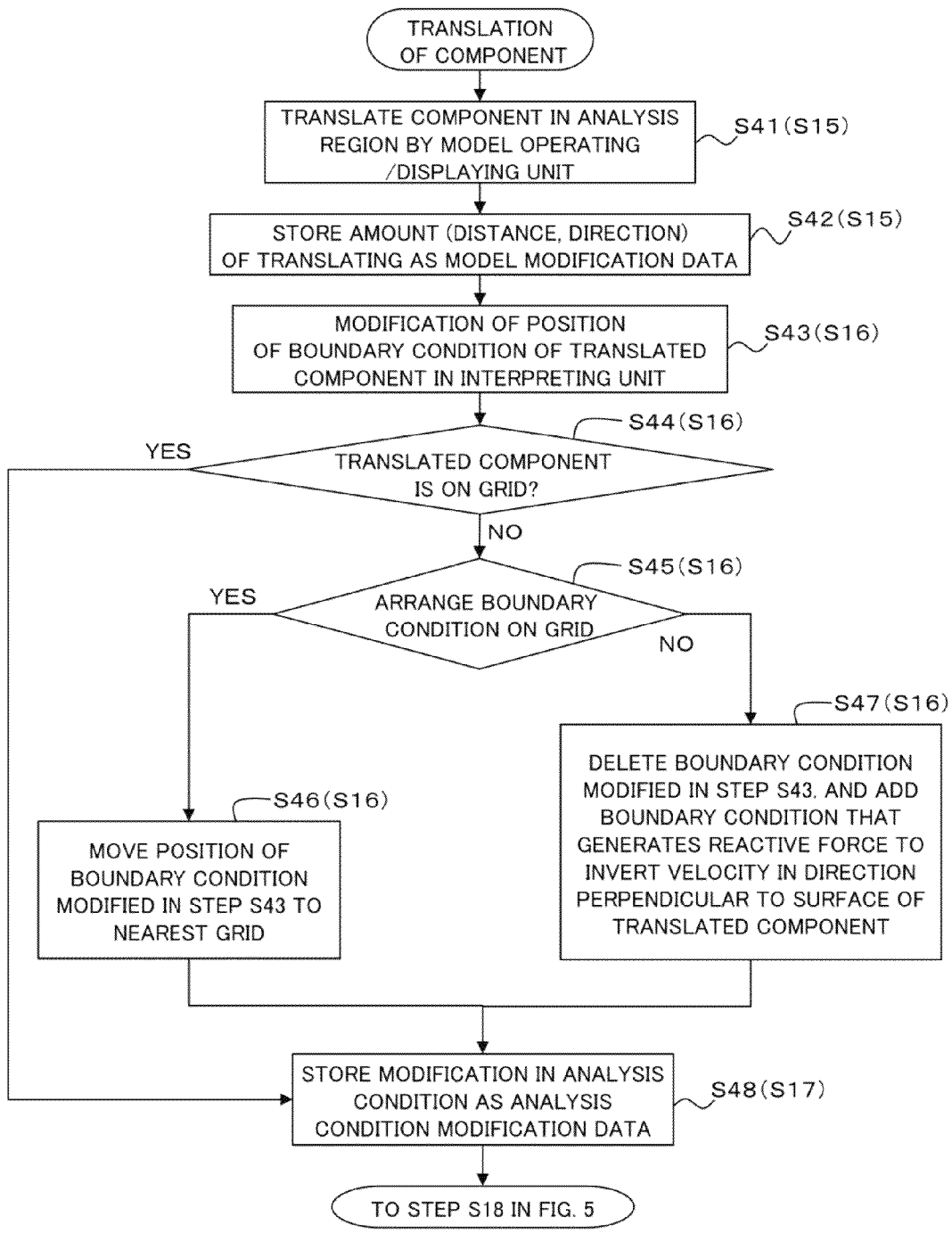
FIG. 7 is a flow diagram illustrating a succession of procedural steps performed in a thermal hydraulic simulating device of the first embodiment when a component of a 3D model is translated.

(2-3-2) Translation of a Component:

Next, description will now be made in relation to a case where the model operation by the operating units 10 and 22 is a translation of the 3D model and the translation, in the form of a modification in analysis condition, is reflected in the thermal hydraulic simulation with reference to a flow diagram (steps S41-S48) of FIG. 7. This description assumes that a component such as a wall is translated. However, the term "component" throughout the specification includes a structure or a product to be simulated and one of parts and elements constitute such a structure or product.

Upon one of the components of the 3D model is translated within the analyzing region through the model operation (see the above operation (11)) by the operating units 10 and 22 (step S41), the amount (distance, direction) of the translating of the model operation is stored, as the model modification data, in the memory region 33 (step S42). The processing of steps S41 and S42 corresponds to that of step S15 of FIG. 5.

The amount (distance, direction) of the translating stored in the memory region 33 is referred by the interpreting unit 24, which then translates the position of the boundary condition (included in the analysis condition) corresponding to the translated component by the referred distance in the referred direction (step S43). The interpreting unit 24 further determines whether the translated component is on a grid of the thermal hydraulic analyzing model (step S44).

If the translated component is not on a grid (NO route in step S44), the interpreting unit 24 determines whether the boundary condition modified is to be arranged on a grid (step S45). Whether a boundary condition is to be arranged on a grid may be predetermined by the user before the simulation starts or may be determined by the user through requesting the user on the monitor 40 in step S45.

If the boundary condition is to be arranged on a grid (YES route in step S45), the interpreting unit 24 corrects (moves) the position of the boundary condition modified in step S43 onto the nearest grid (step S46). On the other hand, if the boundary condition is not to be arranged on a grid (NO route in step S45), the interpreting unit 24 deletes the boundary condition modified in step S43 and adds a new boundary condition that generates a reactive force to invert the velocity in the direction perpendicular to the surface of the translated component to the analysis condition modification data (step S47).

The boundary condition the position of which is moved in step S46 or the boundary condition added in step S47 is stored, as the analysis condition modification data, in the memory region 33 (step S48).

If the component is on a grid (YES route in step S44), the steps S45-S47 are skipped and the boundary condition translated in step S43 is stored, as the analysis condition modification data, in the memory region 33 (step S48).

Storing the analysis condition modification data in step S48 reflects correction and modification of the boundary condition caused by translation by the user in the memory region 33 that the simulating unit 25 is to refer in step S18, and thereby the boundary condition after the correction and the modification is reflected in the analysis to be carried out in the next time step.

Figure 5:
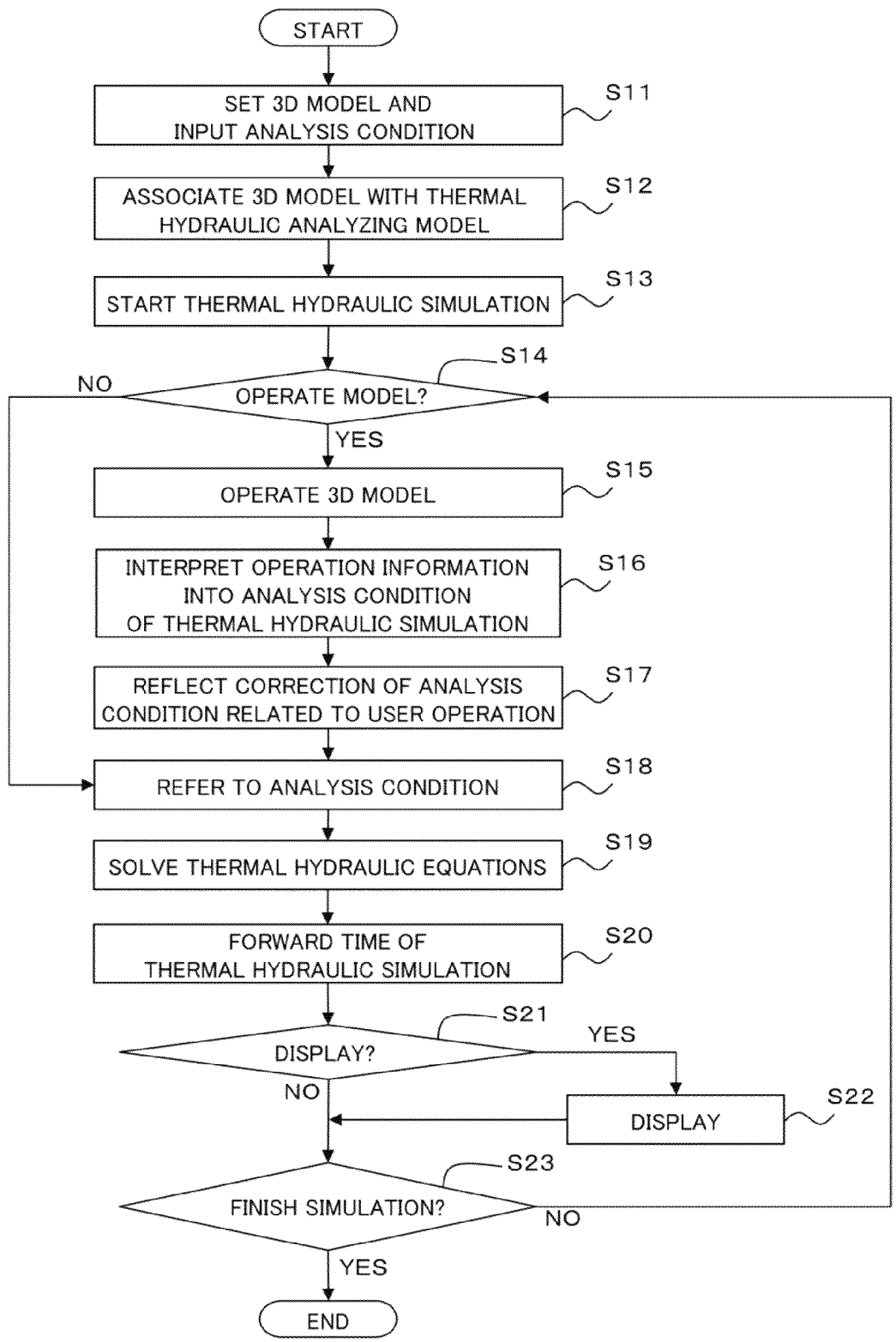
FIG. 5 is a flow diagram illustrating a succession of procedural steps performed in a thermal hydraulic simulating device of the first embodiment.

The processing of the steps S43-S47 corresponds to that of step S16 in FIG. 5 and the processing of the step S48 corresponds to that of step S17 in FIG. 5.

If the object translated by the user operation is a group of a number of components, the components are regarded as a single component, which undergoes the above processing.

Figure 8:
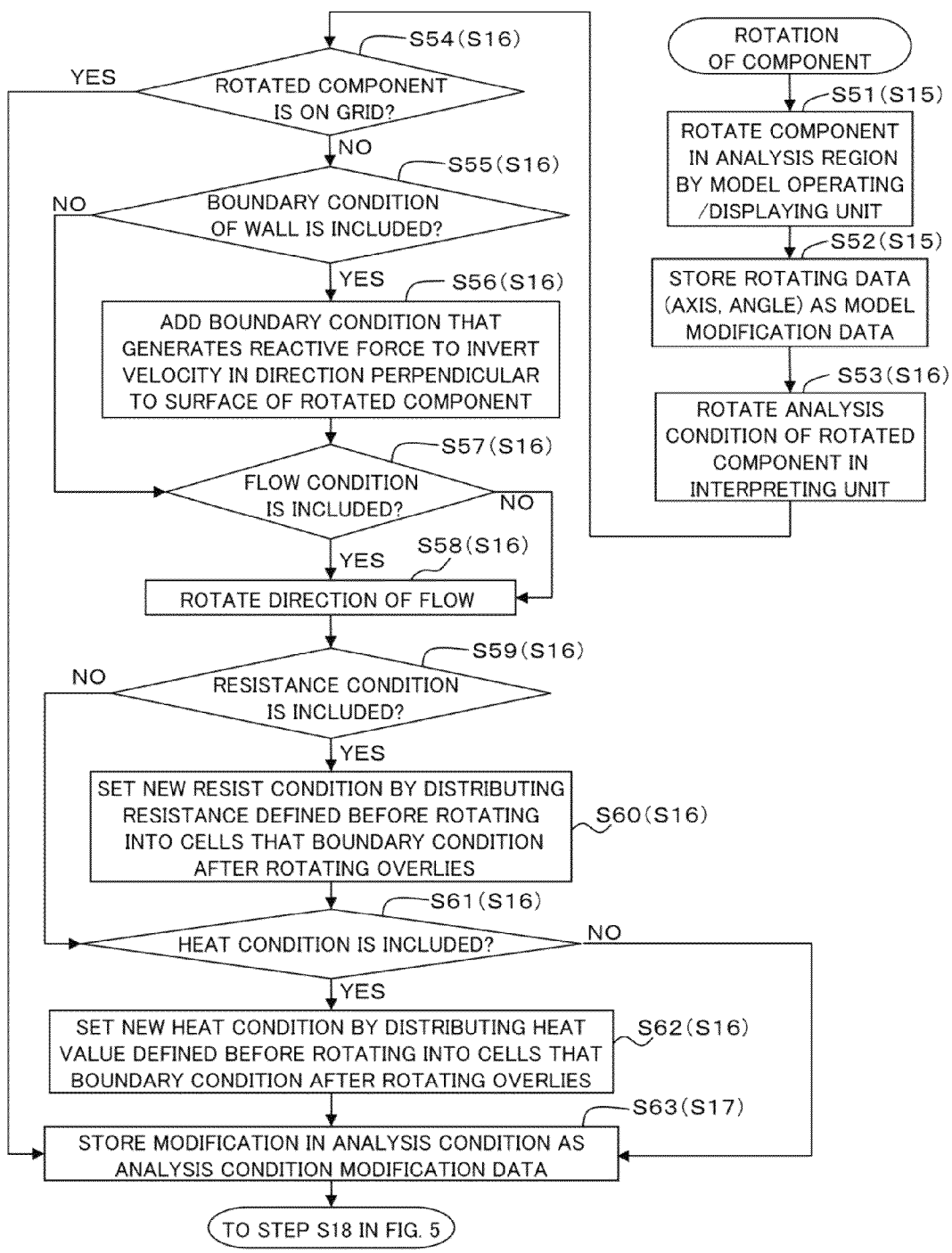
FIG. 8 is a flow diagram illustrating a succession of procedural steps performed in a thermal hydraulic simulating device of the first embodiment when a component of a 3D model is rotated.

(2-3-3) Rotation of a Component:

Next, description will now be made in relation to a case where the model operation by the operating units 10 and 22 is rotating of a component of the 3D model and the rotating of the component, in the form of a modification in the analysis condition, is reflected in the thermal hydraulic simulation with reference to a flow diagram (steps S51-S63) of FIG. 8.

Upon one of the components of the 3D model is rotated within the analyzing region through the model operation (see the above operation (11)) by the operating units 10 and 22 (step S51), rotating data (axis and angle of the rotating) caused by the model operation is stored, as the model modification data, in the memory region 33 (step S52). The processing of steps S51 and S52 corresponds to that of step S15 of FIG. 5.

The rotating data (axis and angle of the rotating) stored in the memory region 33 is referred by the interpreting unit 24, which then rotates (modifies) the position of the analysis condition corresponding to the component through rotation using the same axis and angle of rotation as the referred axis and angle (step S53). The interpreting unit 24 further determines whether the rotated component is on a grid of the thermal hydraulic analyzing model (step S54).

If the rotated component is not on a grid (NO route in step S54), the interpreting unit 24 determines whether the analysis condition includes a boundary condition related to a wall (step S55). If a boundary condition of a wall is included (YES route in step S55), the interpreting unit 24 deletes the boundary condition included in the analysis condition modified in step S53 and adds a new boundary condition that generates a reactive force to invert the velocity in the direction perpendicular to the surface of the rotated component to the analysis condition modification data (step S56). If the object rotated by the user operation is a group of a number of components, the components are regarded as a single component, which undergoes the processing of step S56.

After the processing of step S56 finishes or if a boundary condition of a wall is not included (NO route in step S55), the interpreting unit 24 further determines whether the analysis condition includes a flow condition (such as a direction of air flow of a cooling fan) (step S57). If a flow condition is included (YES route in step S57), the interpreting unit 24 modifies the flow condition (i.e., a direction of flow) included in the analysis condition through rotation using the rotating data (axis and angle of rotating) stored in the memory region 33 (step S58).

Conversely, after the processing of step S58 finishes or if a flow condition is not included (NO route in step S57), the interpreting unit 24 further determines whether the analysis condition includes a resistance condition (step S59). If a resistance condition is included (YES route in step S59), the interpreting unit 24 sets a new resistance condition (resistances), as the analysis condition modification data, by distributing the resistance (numeric value) of the resistance condition included in the analysis condition, that is, the resistance defined before the rotating, into cells that the boundary condition after the rotating overlies according to the ratio of areas or volumes of the cells (step S60).

After the processing of step S60 finishes or if a resistance condition is not included (NO route in step S59), the interpreting unit 24 determines whether the analysis condition includes heat condition (step S61). If a heat condition is included (YES route in step S61), the interpreting unit 24 sets a new heat condition (heat amount), as the analysis condition modification data, by distributing a heat value serving as the heat condition included in the analysis condition, that is the heat amount defined before the rotating, to cells that the heat condition after the rotation overlies according to a ratio of areas and volumes of the cells (step S62).

The boundary condition added in step S56, the flow condition modified in step S58, the resistance condition set in step S60, and the heat condition set in step S62 are stored, as the analysis condition modification data, in the memory region 33 (step S63).

If the component is on the grid (YES route in step S54), the processing of steps S55-S62 is skipped and the analysis condition rotated in step S53 is stored, as the analysis condition modification data, in the memory region 33 (step S63).

Storing the analysis condition modification data in step S63 reflects correction and modification in the analysis condition due to rotating by the user in the memory region 33, which the simulating unit 25 is to refer in step S18, and thereby reflects the analysis condition after the correction and the modification in the analysis to be carried out in the next time step.

The processing of steps S53-S62 corresponds to that of step S16 in FIG. 5, and the processing of step S63 corresponds to that of step S17 in FIG. 5.

Figure 10:
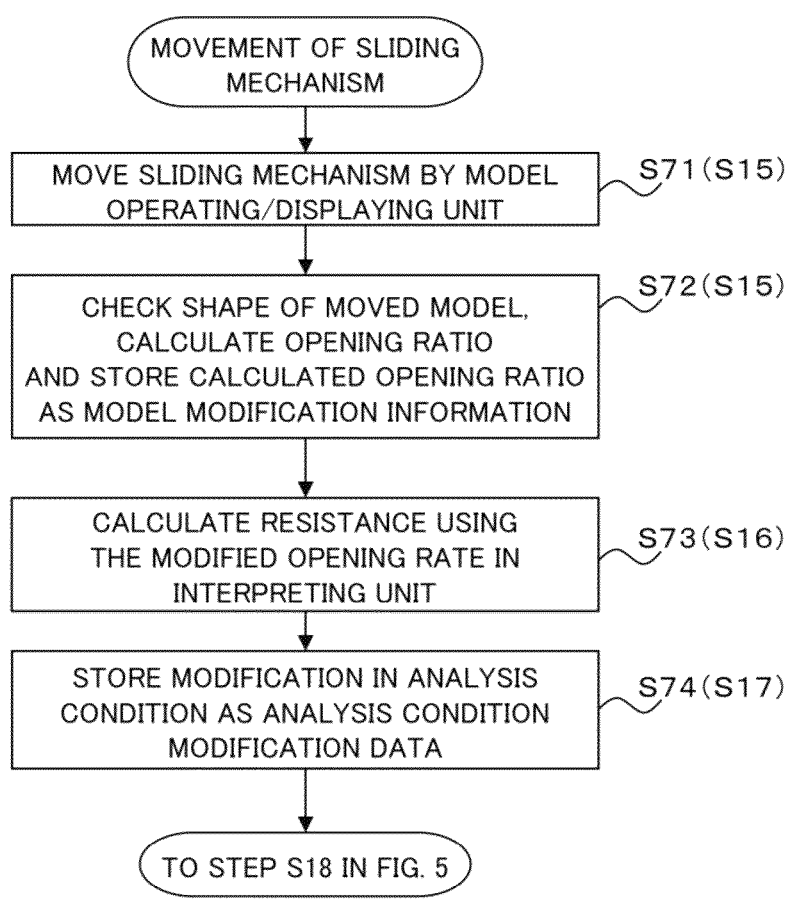
FIG. 10 is a flow diagram illustrating a succession of procedural steps performed in a thermal hydraulic simulating device of the first embodiment when the shutter mechanism of a 3D model is slid.

(2-3-4) Movement of a Sliding Mechanism:

Next, description will now be made in relation to a case where the model operation by the operating units 10 and 22 is moving of a sliding mechanism of the 3D model and the moving of the sliding mechanism, in the form of a modification in the analysis condition, is reflected in the thermal hydraulic simulation with reference to a flow diagram (steps S71-S74) of FIG. 10.

A slide mechanism is a movable mechanism consisting of a movable part and a fixed part, the movable part being movable in a predetermined direction defined with respect to the fixed part. Forming openings on both the movable part and the fixed part makes the sliding mechanism to serve as a shutter mechanism having an opening ratio varying with the sliding movement of the movable part. An opening ratio is a ratio of an area of a hole to the total area of one face.

Figure 9A:
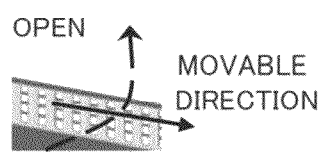
FIGS. 9A and 9B are diagrams illustrating example of displaying of a shutter mechanism of a 3D model in an opening state and a closed state, respectively.
Figure 9B:
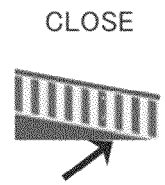

Here, the sliding mechanism is exemplified by a shutter mechanism as depicted in FIGS. 9A and 9B, and is associated with the resistance condition of the thermal hydraulic analyzing model. FIGS. 9A and 9B depict examples of displaying the shutter mechanism on the monitor 40; specifically, FIG. 9A illustrates an example of displaying the shutter mechanism of the 3D model in an opening state; and FIG. 9B is an example of the 3D model in a closed state. Besides the shutter mechanism, an example of the sliding mechanism is a sliding door.

Upon the shutter mechanism of the 3D model is moved from the state of FIG. 9A to the state of FIG. 9B through the model operation (see above operation (12)) by the operating units 10 and 22 (step S71), the opening ratio after the sliding is calculated and stored, as the model modification data, in the memory region 33 (step S72). The processing of steps S71 and S72 corresponds to the processing of step S15 in FIG. 5.

The opening ratio stored in the memory region 33 is referred by the interpreting unit 24, which modifies the resistance value of the resistance condition associated with the shutter mechanism into the referred opening ratio using the following formula (4) (step S73). The resistance serving as a resistance condition is expressed in the form of a pressure loss $\Delta p$ in formula (4). On the basis of the referred opening ratio, the interpreting unit 24 modifies the resistance serving as the resistance condition. The processing of step S73 corresponds to that of step S16 of FIG. 5.

$$\Delta p = \frac{1}{2} f_0 A^2 \rho v^2 \qquad (4)$$

In this formula, the term "v" represents a velocity of the fluid; the term "A" represents an opening ratio; and the term "$f_0$" represents a pressure loss in the absence of resistance.

The modified resistance condition (resistance) is stored, as the analysis condition modification data, in the memory region 33 (step S74). Consequently, the correction and the modification in the resistance serving as the resistance condition, which correction and modification are caused by moving the sliding mechanism by the user, are reflected in the memory region 33, which the simulating unit 25 is to refer in step S18, and thereby the resistance corrected and modified is reflected in the analysis to be carried out in the next time step. The processing of step S74 corresponds to that of step S17 in FIG. 5.

Figure 11:
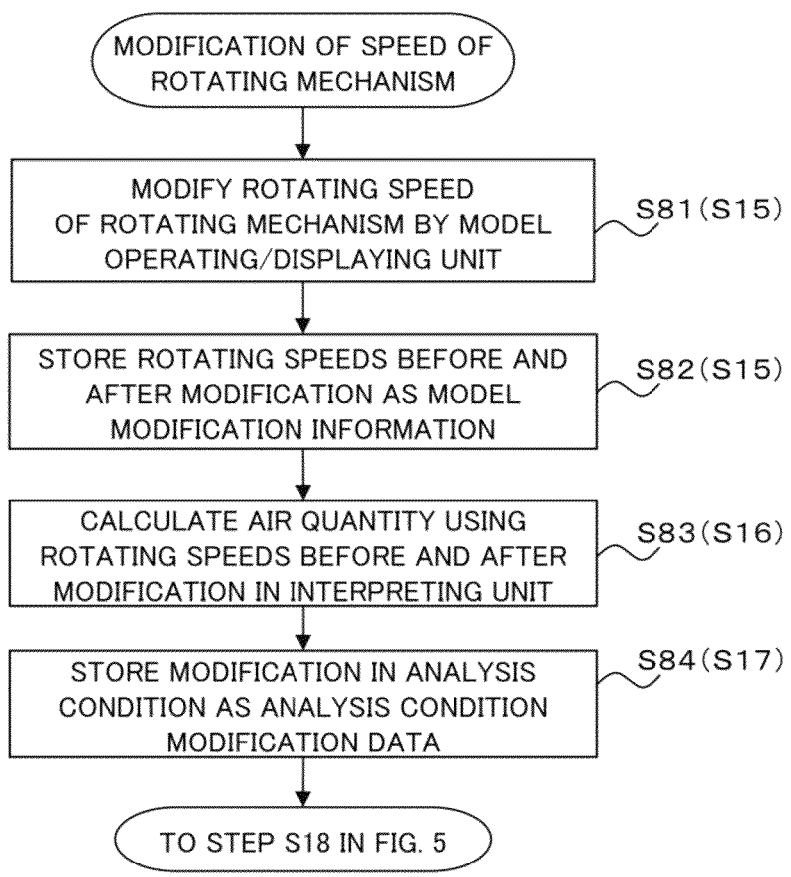
FIG. 11 is a flow diagram illustrating a succession of procedural steps performed in a thermal hydraulic simulating device of the first embodiment when a speed of rotation of a rotating mechanism of a 3D model is modified.

(2-3-5) Modification of the Speed of Rotating Mechanism:

Next, description will now be made in relation to a case where the model operation by the operating units 10 and 22 is a modification of an operating speed (rotating speed) of a rotating mechanism of the 3D model and the modification in operation speed, in the form of a modification of the analysis condition, is reflected in the thermal hydraulic simulation with reference to a flow diagram (steps S81-S84) of FIG. 11. A rotating mechanism has a configuration in which a movable part rotates around a single axis. Here, the rotating mechanism is exemplified by a cooling fan, and is associated with the flow condition of the thermal hydraulic analyzing model.

Upon the rotating speed of a cooling fan of the 3D model is modified through the model operation (see the above operation (12)) by the operating units 10 and 22 (step S81), the rotating speeds $w_1$ and $w_2$ of the rotating mechanism before and after the modification are stored, as the model modification data, in the memory region 33 (step S82). Specifically, the symbol $w_1$ represents the rotating speed before the modification and the symbol $w_2$ represents the rotating speed after the modification. The processing of steps S81 and S82 corresponds to that of step S15 of FIG. 5. This description assumes that the model operation rotates the cooling fan, being rotating at the rotating speed $w_1$, at the rotating speed $w_2$. Providing that the air quantity before the modification in the rotating speed is represented by $V_1$, the air quantity after the modification $V_2$ is represented by the following formula (5).

$$V_2 = \frac{w_2}{w_1} V_1 \qquad (5)$$

The rotating speeds $w_1$ and $w_2$ before and after the modification stored in the memory region 33 are referred by the interpreting unit 24, which modifies the air quantity (i.e. amount of flow) serving as the flow condition of the cooling fan, using the above formula (5) based on the rotating speeds $w_1$ and $w_2$ before and after the modification (step S83). The processing of step S83 corresponds to that of step S16 of FIG.

5. Alternatively, if the interpreting unit 24 grasps the properties of the cooling fan, such as a rotating speed, an air quantity, and a pressure loss between the rear and the front of the cooling fan, the interpreting unit 24 may calculate the air quantities after the modification using the curve expressing the properties.

The modified flow condition (air quantity) is stored, as the analysis condition modification data, in the memory region 33 (step S84). Consequently, the correction and the modification in the air quantity serving as the flow condition, which correction and modification are caused by modification of the rotating speed by the user, are reflected in the memory region 33, which the simulating unit 25 is to refer in step S18, and thereby the air quantity corrected and modified is reflected in the analysis to be carried out in the next time step. The processing of step S84 corresponds to that of step S17 in FIG. 5.

(3) Effects of the Thermal Hydraulic Simulating Device of this Embodiment:

In the thermal hydraulic simulating device 1 of the first embodiment, if the analysis condition is modified by the modifying unit 200, the analysis condition modification data is referred at the timing (i.e. in the step during which time is not forwarded) after the analysis in the time step carried out when the analysis condition is modified and before the analysis to be carried out in the next time step, and the thermal hydraulic simulation is carried out on the basis of the referred analysis condition modification data. Thereby, modification in the analysis condition through the user operation is immediately reflected in performing of the thermal hydraulic simulation. Namely, the analysis condition modified by the model operating/displaying unit 100 and the interpreting unit 24 is immediately reflected in the thermal hydraulic simulation to be carried out in the next time step without restarting the thermal hydraulic simulation from the first time step.

According to the thermal hydraulic simulating device 1 of the first embodiment, upon the user makes an operation on the 3D model through the model operating/displaying unit 100, the result of the simulation in which the user operation is reflected is immediately visualized on the monitor 40. Consequently, the thermal hydraulic simulating device 1 enables an interactive thermal hydraulic simulation.

As the above, since a detailed 3D model that the model operating/displaying unit 100 deals is normally different from a thermal hydraulic analyzing model used in the thermal hydraulic simulation, it is impossible to directly reflect the user operation, without being modified, in the thermal hydraulic simulator. To solve this problem, the thermal hydraulic simulating device 1 disposes the interpreting unit 24 between the model operating/displaying unit 100 and the simulating unit 25. The operation that the user makes on the 3D model via the model operating/displaying unit 100 before or during the analysis by the simulating unit 25 is converted into a modification in the analysis condition by the interpreting unit 24 and is thereby immediately reflected in the analysis to be carried out in the next time step. This makes the user possible to immediately obtain the result of the simulation that the simulating unit 25 carries out on the basis of modification in the 3D model that the user makes via the model operating/displaying unit 100, so that an interactive thermal hydraulic simulation can be realized. Accordingly, in developing a product such as a server and in constructing a structure such as a data center, efficient thermal design can be realized.

(4) Others:

A preferred embodiment of the present invention is detailed as the above. However, the present invention is by no means limited to the first embodiment and may be variously modified without departing the gist of the present invention.

The entire function or a part of the function of the model setting unit 21, the model operating unit 22, the display controller 23, the interpreting unit 24, and the simulating unit 25 is realized by a computer (such as a CPU, an information processor, and various terminals) executing one or more predetermined application program (thermal hydraulic simulating program).

The programs may be provided in the form of being stored in a computer-readable recording medium, such as a flexible disk, a CD (e.g., CD-ROM, CD-R, CD-RW), a DVD (e.g., DVD-ROM, DVD-RAM, DVD-R, DVD-RW, DVD+R, DVD+RW), and a Blu-ray disc. In this case, a computer reads the programs from the recording medium and sends the read programs to an internal or external memory to store for use.

Here, a computer is a concept of a combination of hardware and an OS (Operating System), and means hardware which operates under control of the OS. Otherwise, if an application program operates hardware independently of an OS, the hardware corresponds to the computer. Hardware includes at least a microprocessor such as a CPU and means to read a computer program recorded in a recording medium. The thermal hydraulic simulation program contains a program code that causes the above computer to realize the functions of the model setting unit 21, the model operating unit 22, the display controller 23, the interpreting unit 24, and the simulating unit 25. Part of the functions may be realized by the OS, not by the application program.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment(s) of the present invention has(have) been described in detail, it should be understood that the various changes, substitutions, and alterations could be made hereto without departing from the spirit and scope of the invention.

What is claimed is:

1. A non-transitory computer-readable recording medium in which a thermal hydraulic simulating program that instructs a computer to carry out a simulation of a velocity field and/or a temperature field, the program instructing the computer to execute:
    carrying out the simulation by solving a thermal hydraulic equation on the basis of an analysis condition in each time step;
    modifying the analysis condition;
    when the analysis condition is modified while the simulation is being carried out, storing data related to the modified analysis condition in a memory region;
    after completion of the simulation in a first time step being carried out at the modifying the analysis condition and before start of the simulation in a second time step after the first time step, referring to the data related to the modified analysis condition stored in the memory region;
    carrying out the simulation based on the data related to the modified analysis condition in the second time step;
    displaying a three-dimensional (3D) model representing a space including the velocity field and/or the temperature field on a monitor; and
    if a sliding mechanism having an opening ratio varying with sliding of the sliding mechanism is slid on the 3D model displayed on the monitor,
    modifying a resistance, serving as a resistance condition of the sliding mechanism and included in the analysis condition, in accordance to the opening ratio varied through the sliding.

2. The non-transitory computer-readable recording medium according to claim 1, the program instructing the computer to further execute:
    if a component of the 3D model displayed on the monitor is translated,
    modifying a position of a boundary condition, associated with the translated component and included in the analysis condition, in accordance with a distance and a direction of the translating.

3. The non-transitory computer-readable recording medium according to claim 2, the program instructing the computer to further execute:
    if the translated component is not arranged on a grid of a thermal hydraulic analyzing model,
    moving the position of the boundary condition associated with the translated component onto a nearest grid.

4. The non-transitory computer-readable recording medium according to claim 2, the program instructing the computer to further execute:
    if the translated component is not arranged on a grid of a thermal hydraulic analyzing model,
    deleting the boundary condition associated with the translated component; and
    adding a second boundary condition, that generates a reactive force to invert a velocity in a direction perpendicular to a surface of the translated component disposed at a position after the translating, to the modification data of the analysis condition.

5. The non-transitory computer-readable recording medium according to claim 1, the program instructing the computer to further execute:
    if a component of the 3D model displayed on the monitor is rotated,
    modifying a position of a boundary condition, associated with the rotated component and included in the analysis condition, through rotating the position of the boundary condition using an axis and an angle of rotation same as those of rotating of the rotated component.

6. The non-transitory computer-readable recording medium according to claim 5, the program instructing the computer to further execute:
    if the rotated component is not arranged on a grid of a thermal hydraulic analyzing model,
    deleting the boundary condition associated with the rotated component; and
    adding a second boundary condition, that generates a reactive force to invert a velocity in a direction perpendicular to a surface of the rotated component disposed at a position after the rotating, to the modification data of the analysis condition.

7. The non-transitory computer-readable recording medium according to claim 1, the program instructing the computer to further execute interpreting data about the modifying related to the operating on the 3D model into modification data of the analysis condition and storing the modification data as the data related to the modified analysis condition in the memory region.

8. A thermal hydraulic simulating device that carries out a simulation of a velocity field and/or a temperature field, the thermal hydraulic simulating device comprising:

a processor, a memory, and a monitor, wherein the processor carries out the simulation by solving a thermal hydraulic equation on the basis of an analysis condition in each time step;

modifies the analysis condition;

when the analysis condition is modified while the simulation is being carried out, stores data related to the modified analysis condition in a memory region in the memory;

after completion of the simulation in a first time step being carried out at the time of the modifying the analysis condition and before the start of the simulation in a second time step next after the first time step, refers to the data related to the modified analysis condition stored in the memory region, and carries out the simulation based on the data related to the modified analysis condition in the second time step;

displays a three-dimensional (3D) model representing a space including the velocity field and/or the temperature field on the monitor; and if a sliding mechanism having an opening ratio varying with sliding of the sliding mechanism is slid on the 3D model displayed on the monitor, modifies a resistance, serving as a resistance condition of the sliding mechanism and included in the analysis condition, in accordance to the opening ratio through the sliding.

9. The thermal hydraulic simulating device according to claim 8, wherein if a component of the 3D model displayed on the monitor is translated, the processor modifies a position of a boundary condition, associated with the translated component and included in the analysis condition, in accordance with a distance and a direction of the translating.

10. The thermal hydraulic simulating device according to claim 9, wherein if the translated component is not arranged on a grid of a thermal hydraulic analyzing model, the processor moves the position of the boundary condition associated with the translated component onto a nearest grid.

11. The thermal hydraulic simulating device according to claim 9, wherein, if the translated component is not arranged on a grid of a thermal hydraulic analyzing model, the processor deletes the boundary condition associated with the translated component, and adds a second boundary condition, that generates a reactive force to invert a velocity in a direction perpendicular to a surface of the translated component disposed at a position after the translating, to the modification data of the analysis condition.

12. The thermal hydraulic simulating device according to claim 8, wherein if a component of the 3D model displayed on the monitor is rotated, the processor modifies a position of a boundary condition, associated with the rotated component and included in the analysis condition, through rotating the position of the boundary condition using an axis and an angle of rotation same as those of rotating of the rotated component.

13. The thermal hydraulic simulating device according to claim 12, wherein, if the rotated component is not arranged on a grid of a thermal hydraulic analyzing model, the processor deletes the boundary condition associated with the rotated component, and adds a second boundary condition, that generates a reactive force to invert a velocity in a direction perpendicular to a surface of the rotated component disposed at a position after the rotating, to the modification data of the analysis condition.

14. The thermal hydraulic simulating device according to claim 12, wherein the processor rotates a direction of flow, serving as a flow condition associated with the rotated component and included in the analysis condition, through rotating the position of the boundary condition using the axis and the angle of rotation same as those of rotating of the rotated component.

15. The thermal hydraulic simulating device according to claim 14, wherein the processor distributes a resistance and/or a heat value, respectively serving as a resistance condition and/or the heat condition associated with the rotated component and included in the analysis condition, to one or more cells that the boundary condition of the rotated component overlies in accordance with an area ratio or a volume ratio of the cells to thereby generate a second resistance condition and/or a second heat condition, and set the second resistance condition and/or the second heat condition to be the modification data of the analysis condition.

16. The thermal hydraulic simulating device according to claim 8, wherein the processor translates data about the modifying related to the operating on the 3D model into modification data of the analysis condition and stores the modification data as the data related to the modified analysis condition in the memory region.

17. A method for a thermal hydraulic simulation of a velocity filed and/or a temperature field using a computer, comprising:

carrying out the simulation by solving a thermal hydraulic equation on the basis of an analysis condition in each time step;

modifying the analysis condition;

when the analysis condition is modified while the simulation is being carried out, storing data related to the modified analysis condition in a memory region;

after the completion of the simulation in a first time step being carried out at the time of the modifying the analysis condition and before the start of the simulation in a second time step next after the first time step, referring to the data related to the modified analysis condition stored in the memory region;

carrying out the simulation based on the data related to the modified analysis condition in the second time step;

displaying a three-dimensional (3D) model representing a space including the velocity field and/or the temperature field on a monitor; and if a sliding mechanism having an opening ratio varying with sliding of the sliding mechanism is slid on the 3D model displayed on the monitor, modifying a resistance, serving as a resistance condition of the sliding mechanism and included in the analysis condition, in accordance to the opening ratio through the sliding.

18. The method according to claim 17 further comprising interpreting data about the modification related to the operating on the 3D model into modification data of the analysis condition and storing the modification data as the data related to the modified analysis condition in the memory region.

* * * * *